US012608226B2

(12) United States Patent
Venkatesan

(10) Patent No.: US 12,608,226 B2
(45) Date of Patent: Apr. 21, 2026

(54) METHOD AND SYSTEM FOR GENERATING A TARGET PATTERN-BASED OPTIMAL SCHEDULING POLICY

(71) Applicant: JPMorgan Chase Bank, N.A., New York, NY (US)

(72) Inventor: Abhiraam Venkatesan, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 467 days.

(21) Appl. No.: 18/232,592

(22) Filed: Aug. 10, 2023

(65) Prior Publication Data

US 2024/0370295 A1     Nov. 7, 2024

(30) Foreign Application Priority Data

May 5, 2023     (IN) .............................. 202311032092

(51) Int. Cl.
G06F 3/00          (2006.01)
G06F 9/48          (2006.01)
G06F 9/54          (2006.01)

(52) U.S. Cl.
CPC .............. G06F 9/4881 (2013.01); G06F 9/54 (2013.01)

(58) Field of Classification Search
CPC ........................................................ G06F 9/48
See application file for complete search history.

(56) References Cited

U.S. PATENT DOCUMENTS

| | | | | |
|---|---|---|---|---|
| 10,678,603 B2 * | 6/2020 | Bianchini | ............. | G06F 9/5077 |
| 11,132,609 B2 * | 9/2021 | Pascanu | ................... | G06N 3/09 |
| 11,188,857 B1 * | 11/2021 | Hill | ......................... | G06F 3/167 |
| 2013/0325768 A1 * | 12/2013 | Sinyavskiy | ............ | G06N 3/049 |
| | | | | 706/16 |

(Continued)

FOREIGN PATENT DOCUMENTS

| | | | | | |
|---|---|---|---|---|---|
| CN | 110971706 A | * | 4/2020 | ............. | H04L 67/60 |
| CN | 111814050 A | * | 10/2020 | ............. | G06Q 50/14 |

(Continued)

OTHER PUBLICATIONS

Zixia Liu, A Reinforcement Learning Based Resource Management Approach for Time-critical Workloads in Distributed Computing Environment. (Year: 2018).*

*Primary Examiner* — Lechi Truong
(74) *Attorney, Agent, or Firm* — GREENBLUM & BERNSTEIN, P.L.C.

(57)          ABSTRACT

A method and a system for generating target pattern-based optimal scheduling policy for a set of jobs of an application is disclosed. The method includes: receiving, historical telemetry data associated with the set of jobs; generating, a workload pattern of the set of jobs based on the historical telemetry data; executing, a set of actions based on the workload pattern and a metadata store information of the set of jobs; generating, an intermediate policy based on the execution of the set of actions; executing, the set of jobs on a set of respective run machines based on the workload pattern and the intermediate policy; determining, a feedback data based on the execution of the set of jobs; and generating, the target pattern-based optimal scheduling policy based on at least one among the feedback data and the set of actions.

20 Claims, 6 Drawing Sheets

(56) References Cited

U.S. PATENT DOCUMENTS

| 2018/0225562 A1* | 8/2018 | van der Made ....... G06N 3/045 |
|---|---|---|
| 2018/0246478 A1* | 8/2018 | Takakura ................. G06N 3/04 |
| 2018/0342004 A1* | 11/2018 | Yom-Tov .............. G06N 20/00 |
| 2019/0318807 A1* | 10/2019 | O'Hara .................. G16B 50/50 |
| 2020/0119556 A1* | 4/2020 | Shi ......................... G06N 3/045 |
| 2020/0122040 A1* | 4/2020 | Juliani, Jr. ............ G06N 3/091 |
| 2020/0178543 A1* | 6/2020 | Stork gennant Wersborg ............ G01J 5/0044 |
| 2020/0226325 A1* | 7/2020 | Mishra .................. G06F 40/205 |
| 2020/0244707 A1* | 7/2020 | Silver .................... G06N 3/045 |
| 2020/0293722 A1* | 9/2020 | Song .................... G06N 3/0499 |
| 2020/0307561 A1* | 10/2020 | Bush .................... G01S 13/931 |
| 2021/0174209 A1* | 6/2021 | Zhuang ............... G06N 3/0442 |
| 2022/0044454 A1* | 2/2022 | Gao ...................... G06T 11/008 |
| 2022/0114301 A1* | 4/2022 | Natarajan .............. G06F 30/27 |
| 2022/0166676 A1* | 5/2022 | Yajnanarayana ......................... G06Q 10/063114 |
| 2022/0292434 A1* | 9/2022 | Khadivi Heris ........................... G06Q 10/063118 |
| 2023/0085858 A1* | 3/2023 | Arlazarov ........ G06V 30/18105 382/175 |
| 2023/0137595 A1* | 5/2023 | Rao ........................ G16H 50/20 607/59 |
| 2023/0379250 A1* | 11/2023 | Thubert .................. H04L 45/42 |

FOREIGN PATENT DOCUMENTS

| CN | 115496431 A | * 12/2022 | ............. G06F 30/27 |
|---|---|---|---|
| EP | 3904973 A1 | * 11/2021 | ............. G06N 3/045 |
| WO | WO-2022240638 A1 | * 11/2022 | ............. G06N 20/00 |

* cited by examiner

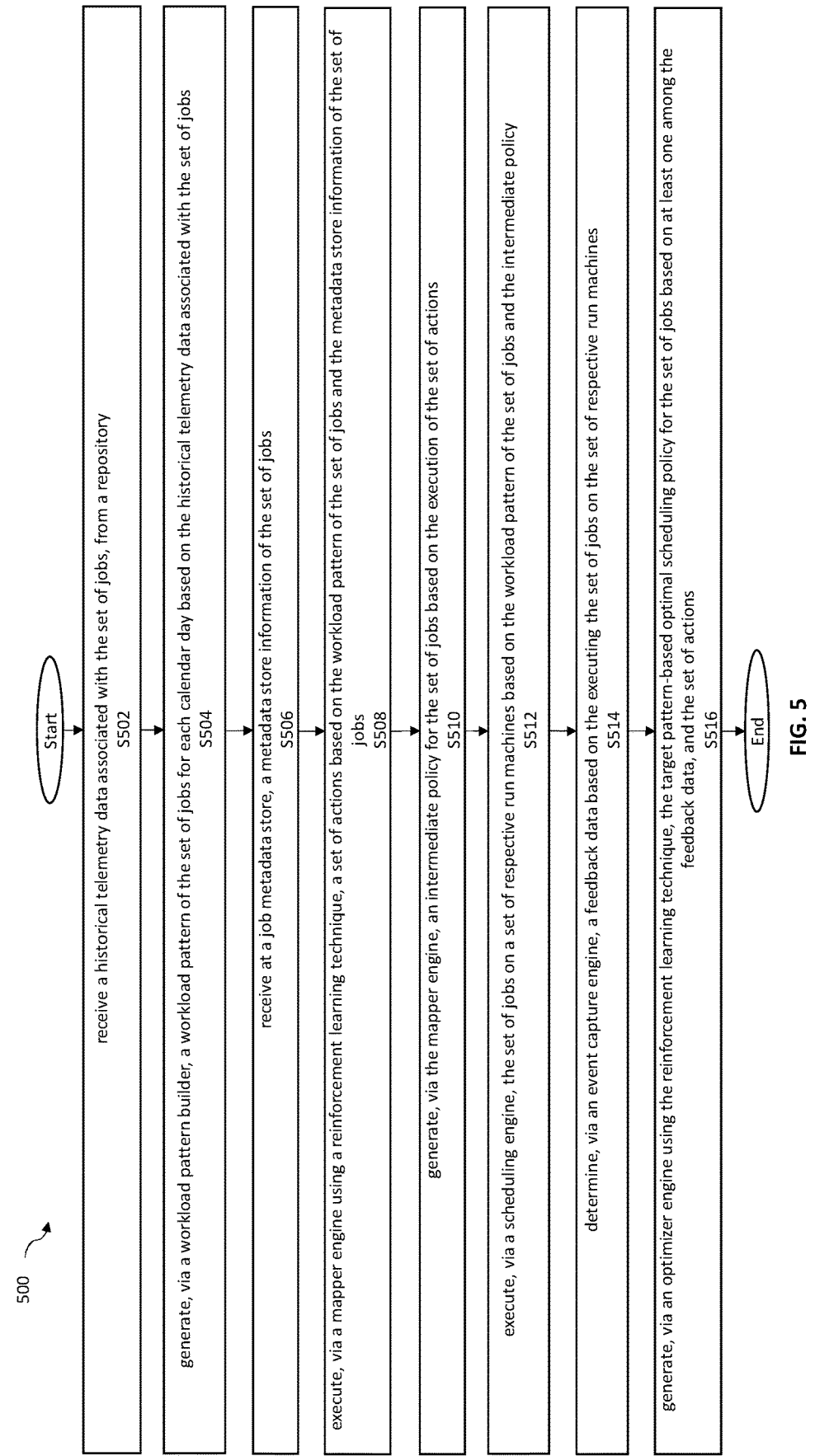

500

Start receive a historical telemetry data associated with the set of jobs, from a repository
S502 generate, via a workload pattern builder, a workload pattern of the set of jobs for each calendar day based on the historical telemetry data associated with the set of jobs
S504 receive at a job metadata store, a metadata store information of the set of jobs
S506 execute, via a mapper engine using a reinforcement learning technique, a set of actions based on the workload pattern of the set of jobs and the metadata store information of the set of jobs
S508 generate, via the mapper engine, an intermediate policy for the set of jobs based on the execution of the set of actions
S510 execute, via a scheduling engine, the set of jobs on a set of respective run machines based on the workload pattern of the set of jobs and the intermediate policy
S512 determine, via an event capture engine, a feedback data based on the executing the set of jobs on the set of respective run machines
S514 generate, via an optimizer engine using the reinforcement learning technique, the target pattern-based optimal scheduling policy for the set of jobs based on at least one among the feedback data, and the set of actions
S516

End

FIG. 5

METHOD AND SYSTEM FOR GENERATING A TARGET PATTERN-BASED OPTIMAL SCHEDULING POLICY

CROSS-REFERENCE TO RELATED APPLICATIONS

This application claims priority benefit from Indian Application No. 202311032092, filed on May 5, 2023 in the India Patent Office, which is hereby incorporated by reference in its entirety.

BACKGROUND

Field of the Disclosure

This technology generally relates to application batch workloads, and more particularly to methods and systems for generating and providing a pattern-based optimal scheduling policy for the application batch workloads.

Background Information

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as an admission of the prior art.

An application batch workload may consist of many repetitive transactions to a database with some heavy computational work for each transaction, and a process to run such application batch workload is called batch processing. Particularly, the batch processing is a method used for completing high-volume and repetitive data jobs in batches. An example of a batch workload of an application (herein the batch workload may be referred to as a set of jobs) may be a calculation of total transactions made on a given day. In this example, batch processing may include retrieving every transaction for the day from a database, extracting its transaction amount, and maintaining a running sum of all retrieved transactions.

Execution of batch workloads such as for examples execution of any job that has to be done on a regular basis may be automated using job scheduler tools. Though currently several job scheduler tools have been developed based on the existing technologies, but these currently known job scheduler tools have certain limitations. For example, they fail to go beyond an internal state of a system to identify 1) dependencies of a job of an application on other job(s) of said application, and 2) schedule time slots to execute jobs of said application, that yields best performance results for different workload patterns of the jobs of said application. Also, the existing job scheduler tools can only be executed at a predefined schedule time or when a specific event occurs to automate different tasks. Additionally, for some of the existing job scheduler tools below definitions or criteria are required to be defined manually by developers:

1) Schedule or time slots of each job to be executed, which may determine if it is a sequential execution or parallel execution,
2) Order of execution for different jobs to be executed,
3) Run Machine for each job to be executed (Distributed environment), and 4) Dependency between the different jobs to be executed etc.

As workload patterns of jobs of an application are dynamic in nature based on an inbound data volume, currently there is a requirement to move away from static job definitions or criteria and to move towards more adaptive engines that are capable of defining and scheduling jobs of any application based on a pattern of workload of said jobs to achieve best performance results. Currently, human intervention is required to 1) manually try parameters such as time slots, order of execution, run machine, dependency etc. for different combinations on trial-and-error basis and 2) monitor a performance and concurrency of jobs to finalize a schedule for the jobs, however a probability of trying the different combinations and the monitoring of the performance and the concurrency based on the human intervention is not practical.

Considering an exemplary scenario where there are 1) 50 application jobs and 10 run machines (cluster), wherein each run machine has different hardware configurations, 2) 30 application jobs out of the 50 application jobs have static workloads and daily processes more or less 5 terabyte (TB) data, 3) 15 application jobs out of the 50 application jobs have dynamic workloads and on a last day of every month processes 100 TB data, otherwise processes only 1 TB data on weekdays, on holidays and on weekends, and 4) 5 application jobs out of the 50 application jobs have dynamic workloads and on 15th day of every month processes 100 TB data, otherwise daily processes only 50 TB data. In the given exemplary scenario, the existing solutions fail to complete all these jobs in a fastest way and to yield best performance results dynamically.

Therefore, to complete all these jobs in the fastest way and to yield the best performance results dynamically, there requires a recommendation engine to know 1) which job(s) out of the all these jobs may be executed on which run machine, 2) should it be a sequential or a parallel execution of the job(s), which may be determined by a schedule or a slot time, and 3) what is an order of execution of the job(s).

Accordingly, in view of the above-mentioned and other existing limitations, there exists a need to provide an efficient solution to overcome the limitations of the existing arts, and to develop a method and a system for generating a target pattern-based optimal scheduling policy for a set of jobs of an application, wherein such target pattern-based optimal scheduling policy may be used for a real-time execution of the set of jobs to yields best performance results such as best job execution time.

SUMMARY

The present disclosure, through one or more of its various aspects, embodiments, and/or specific features or sub-components, provides, inter alia, various systems, servers, devices, methods, media, programs, and platforms for generating a target pattern-based optimal scheduling policy for a set of jobs of an application.

According to an aspect of the present disclosure, a method for generating a target pattern-based optimal scheduling policy for a set of jobs of an application is disclosed. The method may include: receiving, by the at least one processor via a communication interface, a historical telemetry data associated with the set of jobs, from a repository; generating, by the at least one processor via a workload pattern builder, a workload pattern of the set of jobs for each calendar day based on the historical telemetry data associated with the set of jobs; receiving, by the at least one processor at a job metadata store, a metadata store information of the set of jobs; executing, by the at least one processor via a mapper engine using a reinforcement learning technique, a set of actions based on the workload pattern of the set of jobs and the metadata store information of the set of jobs; generating, by the at least one processor via the mapper engine, an intermediate policy for the set of jobs based on the execution of the set of actions; executing, by the at least one processor via a scheduling engine, the set of jobs on a set of respective run machines based on the workload pattern of the set of jobs and the intermediate policy; determining, by the at least one processor via an event capture engine, a feedback data based on the execution of the set of jobs on the set of respective run machines; and generating, by the at least one processor via an optimizer engine using the reinforcement learning technique, the target pattern-based optimal scheduling policy for the set of jobs based on at least one among the feedback data, and the set of actions.

In accordance with an exemplary embodiment, the historical telemetry data is further associated with an execution of the set of jobs on at least one among a daily level, a monthly level, a quarterly level and a yearly level, and the historical telemetry data may include at least one among a storage consumption information, a CPU utilization information, a memory usage information, a buffer usage information, a disk activity information, and a network bandwidth usage information.

In accordance with an exemplary embodiment, the workload pattern of the set of jobs is generated based on an implementation of a fuzzy logic technique on the historical telemetry data, and the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level.

In accordance with an exemplary embodiment, the metadata store information of each job from the set of jobs may include at least one among a job name, a container image information, a command line, a cluster of run machines, a run machine category sizing data, a job schedule time slot configuration window, a dependency information, and a priority information.

In accordance with an exemplary embodiment, the method may further include: generating by the at least one processor via a queue manager a sequence of execution for each job based on the dependency information, the priority information, and an availability of a set of run machines to execute said job; determining, by the at least one processor via a dependency engine, a directed acyclic graph of at least one dependent job from the set of jobs based on the feedback data and the metadata store information; and generating, by the at least one processor via the optimizer engine using the reinforcement learning technique, the target pattern-based optimal scheduling policy for the set of jobs based on at least one among the sequence of execution for each job and the directed acyclic graph.

In accordance with an exemplary embodiment, the method may further include creating by the at least one processor via a job definition engine, a job definition for each job from the set of jobs based on the metadata store information of said each job.

In accordance with an exemplary embodiment, the executing, by the at least one processor via the mapper engine using the reinforcement learning technique, the set of actions may include at least one among: incrementally mapping the set of jobs to the set of respective run machines; determining for the set of jobs at least one among a set of job schedule times, a set of type of executions, and a set of order of executions; and shuffling at least one among the set of job schedule times, the set of type of executions, and the set of order of executions.

In accordance with an exemplary embodiment, the intermediate policy may include at least one among an intermediate schedule time, an intermediate run machine and an intermediate dependency job name; and the target pattern-based optimal scheduling policy may include at least one among a target optimal schedule time, a target optimal run machine and a target optimal dependency job name.

In accordance with an exemplary embodiment, the feedback data may include at least one among an application log data and a performance metric.

According to another aspect of the present disclosure, a computing device configured to generate a target pattern-based optimal scheduling policy for a set of jobs of an application, is disclosed. The computing device may include a processor, a memory, and a communication interface coupled to each of the processor and the memory. The processor may be configured to: receive, via the communication interface from a repository, a historical telemetry data associated with the set of jobs; generate, via a workload pattern builder, a workload pattern of the set of jobs for each calendar day based on the historical telemetry data associated with the set of jobs; receive, at a job metadata store, a metadata store information of the set of jobs; execute, via a mapper engine using a reinforcement learning technique, a set of actions based on the workload pattern of the set of jobs and the metadata store information of the set of jobs; generate, via the mapper engine, an intermediate policy for the set of jobs based on the execution of the set of actions; execute, via a scheduling engine, the set of jobs on a set of respective run machines based on the workload pattern of the set of jobs and the intermediate policy; determine, via an event capture engine, a feedback data based on the execution of the set of jobs on the set of respective run machines; and generate, via an optimizer engine using the reinforcement learning technique, the target pattern-based optimal scheduling policy for the set of jobs based on at least one among the feedback data, and the set of actions.

In accordance with an exemplary embodiment, the historical telemetry data is further associated with an execution of the set of jobs on at least one among a daily level, a monthly level, a quarterly level and a yearly level, and the historical telemetry data may include at least one among a storage consumption information, a CPU utilization information, a memory usage information, a buffer usage information, a disk activity information, and a network bandwidth usage information.

In accordance with an exemplary embodiment, the workload pattern of the set of jobs is generated based on an implementation of a fuzzy logic technique on the historical telemetry data, and the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level.

In accordance with an exemplary embodiment, the metadata store information of each job from the set of jobs may include at least one among a job name, a container image information, a command line, a cluster of run machines, a run machine category sizing data, a job schedule time slot configuration window, a dependency information, and a priority information.

In accordance with an exemplary embodiment, the processor may be further configured to: 1) generate, via a queue manager, a sequence of execution for each job based on the dependency information, the priority information, and an availability of a set of run machines to execute said job; 2) determine, via a dependency engine, a directed acyclic graph of at least one dependent job from the set of jobs based on the feedback data and the metadata store information; and 3) generate, via the optimizer engine using the reinforcement learning technique, the target pattern-based optimal scheduling policy for the set of jobs based on at least one among the sequence of execution for each job and the directed acyclic graph.

In accordance with an exemplary embodiment, the processor may be further configured to create via a job definition engine, a job definition for each job from the set of jobs based on the metadata store information of said each job.

In accordance with an exemplary embodiment, to execute the set of actions the processor may be further configured to: incrementally map the set of jobs to the set of respective run machines; determine for the set of jobs at least one among a set of job schedule times, a set of type of executions, and a set of order of executions; and shuffle at least one among the set of job schedule times, the set of type of executions, and the set of order of executions.

In accordance with an exemplary embodiment, the intermediate policy may include at least one among an intermediate schedule time, an intermediate run machine and an intermediate dependency job name; and the target pattern-based optimal scheduling policy may include at least one among a target optimal schedule time, a target optimal run machine and a target optimal dependency job name.

In accordance with an exemplary embodiment, the feedback data may include at least one among an application log data and a performance metric.

According to yet another aspect of the present disclosure, a non-transitory computer readable storage medium storing instructions for generating a target pattern-based optimal scheduling policy for a set of jobs of an application, is disclosed. The instructions include executable code which, when executed by a processor, may cause the processor to: receive, via a communication interface from a repository, a historical telemetry data associated with the set of jobs; generate, via a workload pattern builder, a workload pattern of the set of jobs for each calendar day based on the historical telemetry data associated with the set of jobs; receive, at a job metadata store, a metadata store information of the set of jobs; execute, via a mapper engine using a reinforcement learning technique, a set of actions based on the workload pattern of the set of jobs and the metadata store information of the set of jobs; generate, via the mapper engine, an intermediate policy for the set of jobs based on the execution of the set of actions; execute, via a scheduling engine, the set of jobs on a set of respective run machines based on the workload pattern of the set of jobs and the intermediate policy; determine, via an event capture engine, a feedback data based on the execution of the set of jobs on the set of respective run machines; and generate, via an optimizer engine using the reinforcement learning technique, the target pattern-based optimal scheduling policy for the set of jobs based on at least one among the feedback data, and the set of actions.

In accordance with an exemplary embodiment, the historical telemetry data is further associated with an execution of the set of jobs on at least one among a daily level, a monthly level, a quarterly level and a yearly level, and the historical telemetry data may include at least one among a storage consumption information, a CPU utilization information, a memory usage information, a buffer usage information, a disk activity information, and a network bandwidth usage information.

In accordance with an exemplary embodiment, the workload pattern of the set of jobs is generated based on an implementation of a fuzzy logic technique on the historical telemetry data, and the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level.

In accordance with an exemplary embodiment, the metadata store information of each job from the set of jobs may include at least one among a job name, a container image information, a command line, a cluster of run machines, a run machine category sizing data, a job schedule time slot configuration window, a dependency information, and a priority information.

In accordance with an exemplary embodiment, when executed by the processor, the executable code may further cause the processor to: 1) generate, via a queue manager, a sequence of execution for each job based on the dependency information, the priority information, and an availability of a set of run machines to execute said job; 2) determine, via a dependency engine, a directed acyclic graph of at least one dependent job from the set of jobs based on the feedback data and the metadata store information; and 3) generate, via the optimizer engine using the reinforcement learning technique, the target pattern-based optimal scheduling policy for the set of jobs based on at least one among the sequence of execution for each job and the directed acyclic graph.

In accordance with an exemplary embodiment, when executed by the processor, the executable code may further cause the processor to create via a job definition engine, a job definition for each job from the set of jobs based on the metadata store information of said each job.

In accordance with an exemplary embodiment, when executed by the processor, the executable code to execute the set of actions may further cause the processor to: incrementally map the set of jobs to the set of respective run machines; determine for the set of jobs at least one among a set of job schedule times, a set of type of executions, and a set of order of executions; and shuffle at least one among the set of job schedule times, the set of type of executions, and the set of order of executions.

In accordance with an exemplary embodiment, the intermediate policy may include at least one among an intermediate schedule time, an intermediate run machine and an intermediate dependency job name; and the target pattern-based optimal scheduling policy may include at least one among a target optimal schedule time, a target optimal run machine and a target optimal dependency job name.

In accordance with an exemplary embodiment, the feedback data may include at least one among an application log data and a performance metric.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 5 illustrates an exemplary method flow diagram for generating a target pattern-based optimal scheduling policy for a set of jobs of an application, in accordance with an exemplary embodiment.

DETAILED DESCRIPTION

Figure 1:
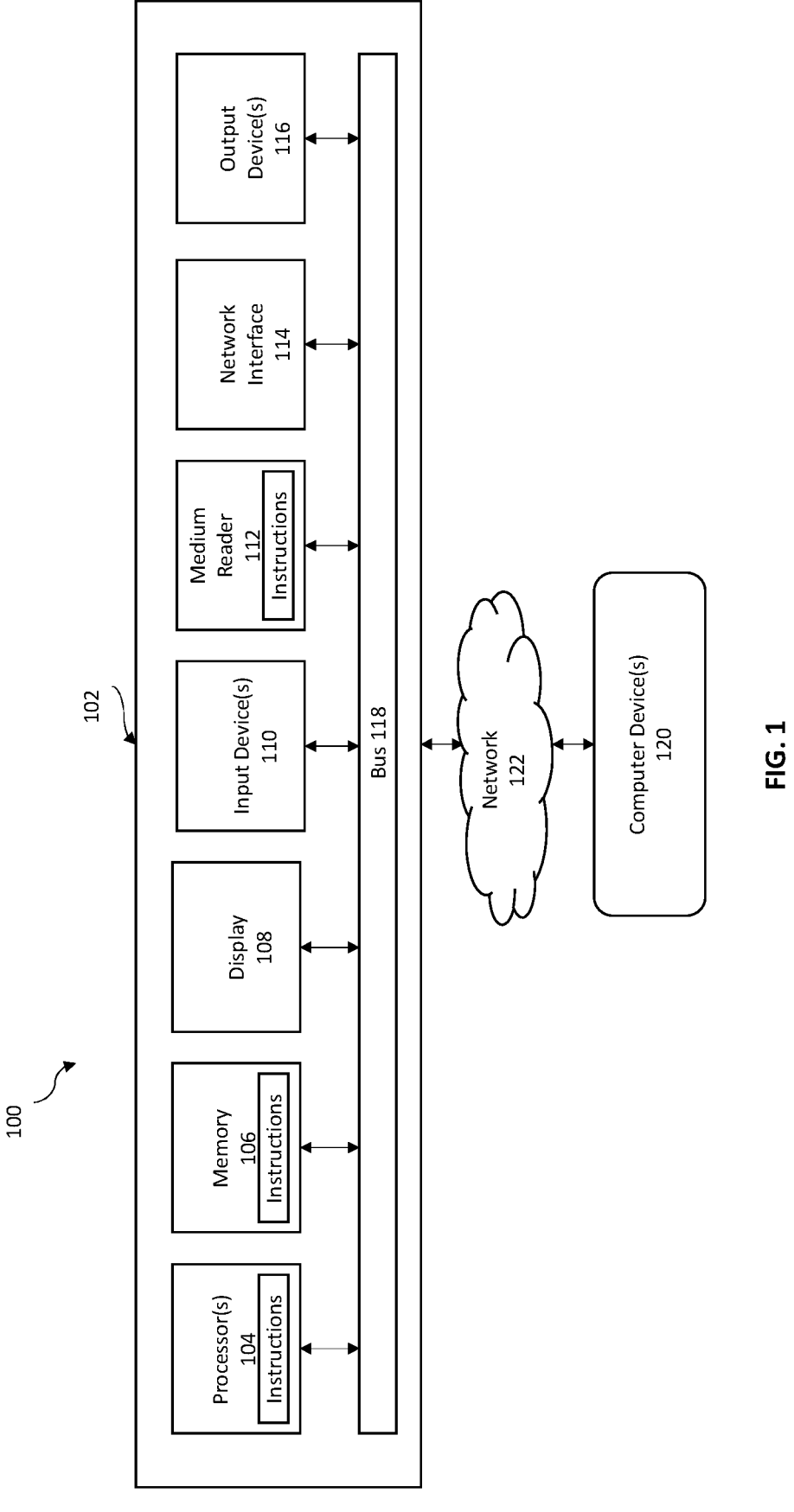
FIG. 1 illustrates an exemplary diagram of a computer system for generating a target pattern-based optimal scheduling policy for a set of jobs of an application, in accordance with an exemplary embodiment.

Exemplary embodiments now will be described with reference to the accompanying drawings. The exemplary embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with scheduling of batch workloads or a set of jobs of an application, the present disclosure provides a method and a system for generating a target pattern-based optimal scheduling policy for the set of jobs of the application. To generate the target pattern-based optimal scheduling policy initially the system implements a fuzzy logic technique on a historical telemetry data of the set of jobs that classifies a pattern of workload for each job from the set of jobs based on the historical telemetry data for a respective frequency (such as for a daily level, a monthly level, a quarterly level or a yearly level). For e.g., for a Job of an application say Job 1 a pattern of workload may be generated as: Day 1 (L), Day 2 (XS), Day 30 (XXL), etc., where the Day 1 (L) indicates that on 1st calendar day workload of the Job 1 is Large (L), the Day 2 (XS) indicates that on 2nd calendar day workload of the Job 1 is extra small (XS) and so on. After the generation of the workload patterns of the set of jobs, the system implements a reinforcement learning technique using probabilistic fuzzy logic that enables a agent to learn an optimal policy by using the workload patterns of the set of jobs as an input and running against different configurations like schedule time, sequential execution, parallel execution, shuffled order of execution and run machine etc. on a simulation environment to derive best performance benchmark configuration (for e.g., best job execution time) as a reward for different calendar days. In an exemplary implementation through multiple experiments on the simulated environment, the system provides best schedule or time slot and job definition that yields best performance results or fastest execution time on cost effective servers for every workload pattern of the set of jobs. Also, the reinforcement learning technique as disclosed in the present disclosure may be associated with a class of techniques for solving problems modelled as at least one among a Markov Decision Process (MDP) and a discrete time stochastic control process that provide a modelling decision making in situations where outcomes are partly random and partly under control of a decision maker. In this regard, the reinforcement learning technique may be composed of an agent (e.g., an autonomous entity which acts, directing its activity towards achieving goals), a set of states, and a set of actions per state (e.g., job slots), and an environment (e.g., run machine). Executing an action in a specific state provides the agent with a cost or a reward (e.g., in form of a numerical score). The goal of the agent is to maximize its total (e.g., future) reward. This is achieved by adding maximum reward attainable from future states to a reward for achieving its current state, effectively influencing a current action by a potential future reward. This potential future reward is a weighted sum of expected values of rewards of all future steps starting from the current state. Example of the reinforcement learning technique may include, but is not limited to, at least one among a Q-learning technique, a State-Action-Reward-State-Action (SARSA) technique, a Deep Q Network (DQN) technique, a Deep Deterministic Policy Gradient (DDPG) technique, an Actor-Critic (A2C) technique, and the like.

In an exemplary implementation the system performs a real time execution of the set of jobs based on the workload pattern of the set of jobs and the optimal policy. The system then uses at least one among a feedback of the real time execution of the set of jobs, a sequence of execution determined for the set of jobs, and a directed acyclic graph of at least one dependent job from the set of jobs, to generate an updated pattern-based optimal scheduling policy for the set of jobs (or referred herein as the target pattern-based optimal scheduling policy for the set of jobs).

Therefore, the present disclosure provides a technical solution of automatically generating and providing a pattern based optimal scheduling policy for application batch workloads which significantly reduces human intervention in job scheduling. Also, the present disclosure provides the technical solution that overcomes the limitations of the existing solutions such as including but is not limited to failure of going beyond an internal state of a system to identify job definition and schedules for execution of jobs of an application that may yield best performance results for different workload patterns of the jobs. The technical solution as disclosed in the present disclosure also overcomes the currently known solutions' limitations that relate to execution of jobs at a predefined schedule time and when a specific event occurs to automate different tasks. Moreover, the technical solution as disclosed in the present disclosure provides technical advantage over the existing solutions by generating and providing best schedule or time slot and job definition that yields best performance results or fastest execution time for every pattern of workload in each job of an application for every calendar day.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, computer system 102 may include or be included within, any one or more computers, servers, systems, communication networks, or cloud-based environment. Even further, the instructions may be operative in a such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read-only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, and unsecure and/or unencrypted. As regards the present disclosure, the computer memory 106 may comprise any combination of memories or single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but is not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating a target pattern-based optimal scheduling policy for a set of jobs of an application.

Figure 2:
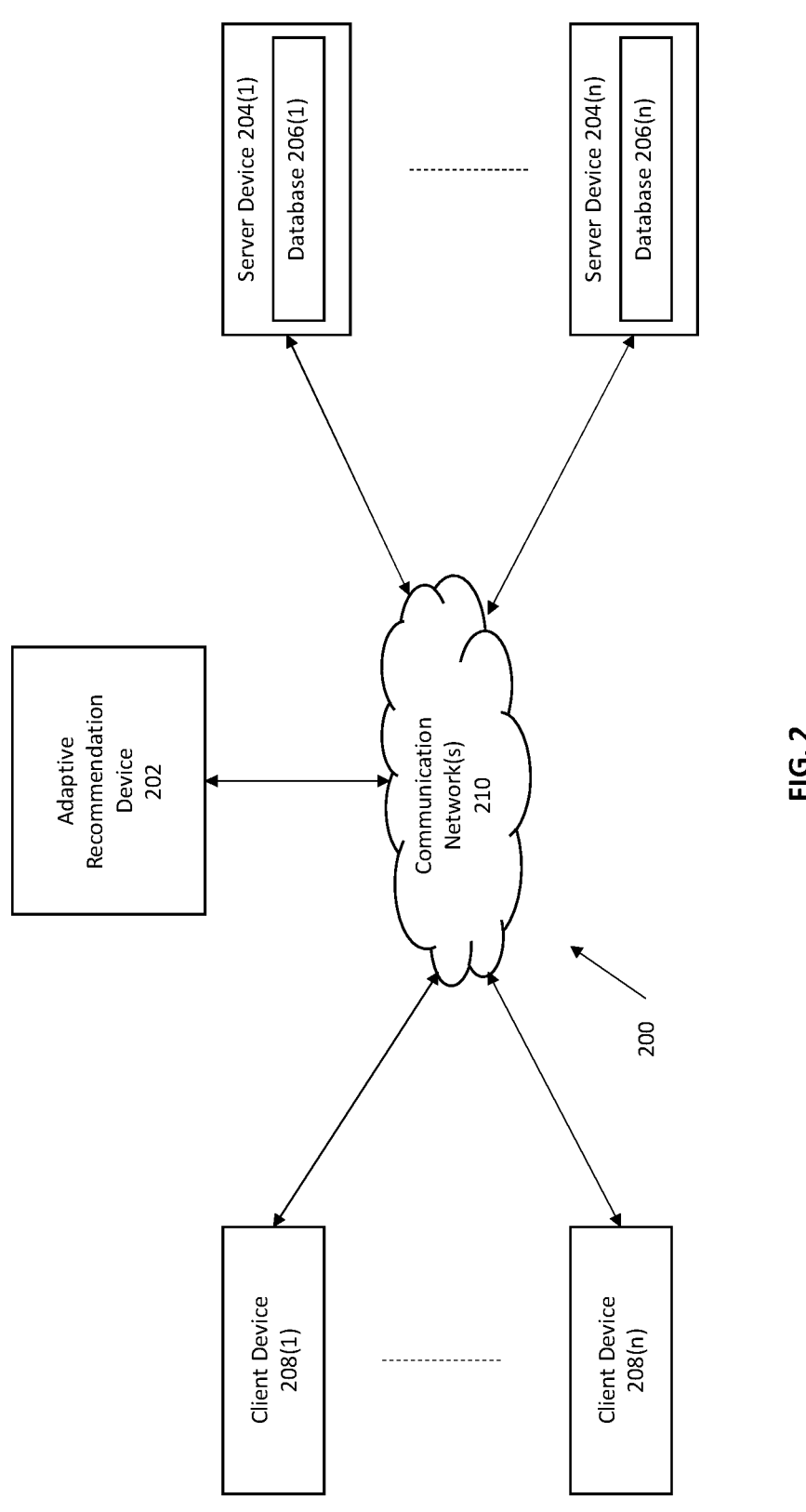
FIG. 2 illustrates an exemplary diagram of a network environment for generating a target pattern-based optimal scheduling policy for a set of jobs of an application, in accordance with an exemplary embodiment.

Referring to FIG. 2, a schematic of an exemplary network environment 200 for implementing a method for generating a target pattern-based optimal scheduling policy for a set of jobs of an application is illustrated. In an exemplary embodiment, the method is executable on any networked computer platform, such as, for example, a personal computer (PC).

The method for generating the target pattern-based optimal scheduling policy for the set of jobs of the application may be implemented by an Adaptive Recommendation (AR) Device 202. The AR device 202 may be the same or similar to the computer system 102 as described with respect to FIG. 1. The AR device 202 may store one or more applications that can include executable instructions that, when executed by the AR device 202, cause the AR device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s), that may be managed in a cloud-based computing environment. Also, the application(s), and even the AR device 202 itself, may be located in virtual server(s) running in a cloud-based computing environment rather than being tied to one or more specific physical network computing devices. Also, the application(s) may be running in one or more virtual machines (VMs) executing on the AR device 202. Additionally, in one or more embodiments of this technology, virtual machine(s) running on the AR device 202 may be managed or supervised by a hypervisor.

In the network environment 200 of FIG. 2, the AR device 202 is coupled to a plurality of server devices 204(1)-204(n) that hosts a plurality of databases or repositories 206(1)-206(n), and also to a plurality of client devices 208(1)-208(n) via communication network(s) 210. A communication interface of the AR device 202, such as the network interface 114 of the computer system 102 of FIG. 1, operatively couples and communicates between the AR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and AR devices 202 that efficiently implement a method for generating a target pattern-based optimal scheduling policy for a set of jobs of an application.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The AR device 202 may be a standalone device or integrated with one or more other devices or apparatuses, such as one or more of the server devices 204(1)-204(n), for example. In one particular example, the AR device 202 may include or be hosted by one of the server devices 204(1)-204(n), and other arrangements are also possible. Moreover, one or more of the devices of the AR device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AR device 202 via the communication network(s) 210 according to Hyper-text Transfer Protocol (HTTP)-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases or repositories 206(1)-206(n) that are configured to store data that relates to a historical telemetry data associated with the set of jobs and a metadata store information of the set of jobs.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the AR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the AR device 202 via the communication network (s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AR device 202, the server devices 204(1)-204(n), or the client devices 208(1)-208(n), for example, may be configured to operate as virtual instances on the same physical machine. In other words, one or more of the AR device 202, the server devices 204(1)-204(n), or the client devices 208(1)-208(n) may operate on the same physical device rather than as separate devices communicating through a communication network(s) 210. Additionally, there may be more or fewer AR devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
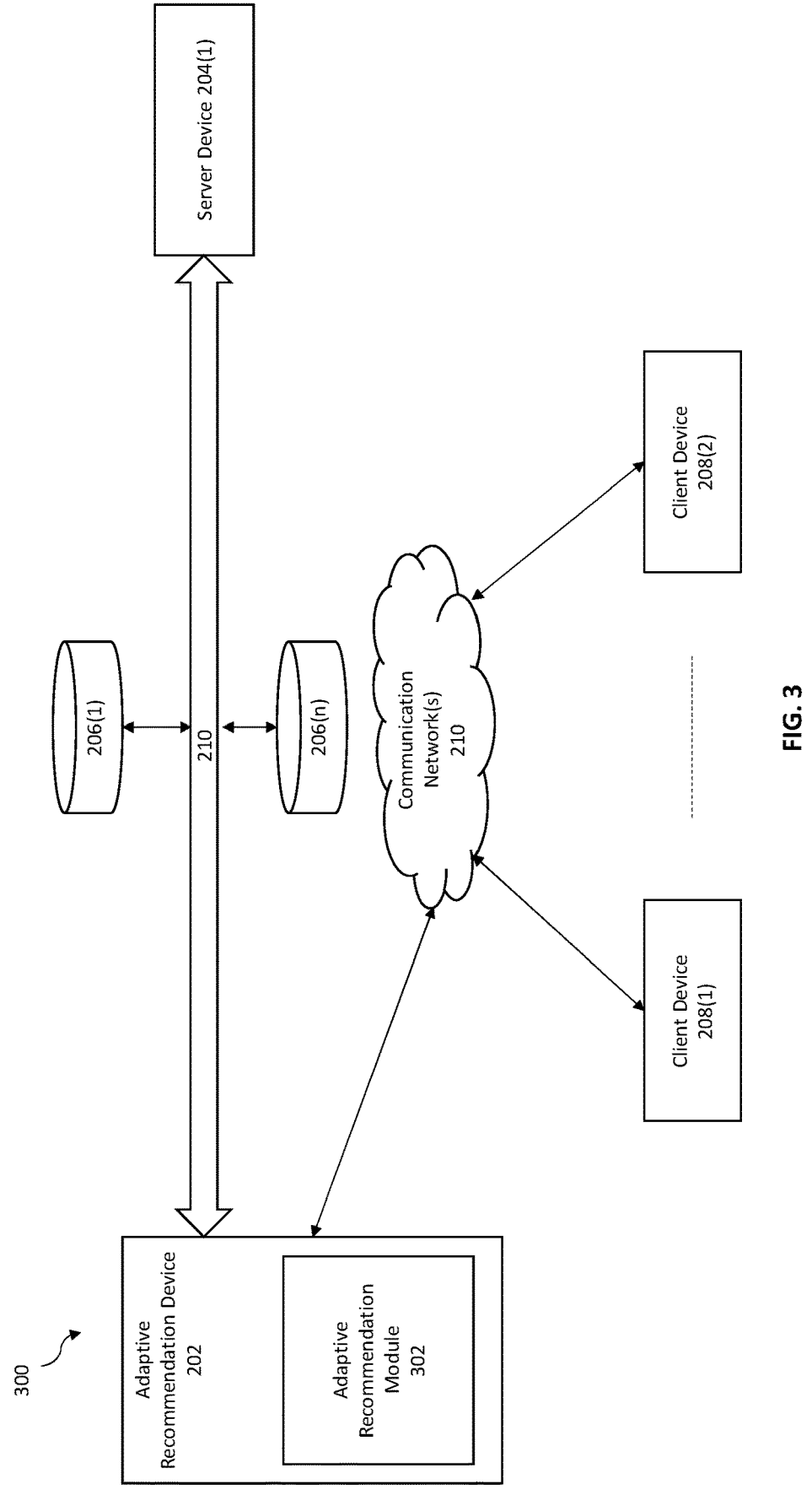
FIG. 3 illustrates an exemplary diagram of a system for implementing a method for generating a target pattern-based optimal scheduling policy for a set of jobs of an application, in accordance with an exemplary embodiment.

FIG. 3 illustrates an exemplary system for implementing a method for generating a target pattern-based optimal scheduling policy for a set of jobs of an application, in accordance with an exemplary embodiment. As illustrated in FIG. 3, according to exemplary embodiments, the system

300 may comprise an AR device 202 including an adaptive recommendation (AR) module 302 that may be connected to a server device 204(1) and one or more repository from the repositories 206(1) . . . 206(n) via a communication network 210, but the present disclosure is not limited thereto.

The AR device 202 is described and shown in FIG. 3 as including the Adaptive Recommendation Module 302, although it may include other rules, policies, modules, databases, or applications, for example. As will be described below, the Adaptive Recommendation Module 302 is configured to implement a method for generating a target pattern-based optimal scheduling policy for a set of jobs of an application.

An exemplary process for implementing a mechanism for generating a target pattern-based optimal scheduling policy for a set of jobs of an application by utilizing the network environment of FIG. 2 is shown as being executed in FIG. 3. Specifically, a first client device 208(1) and a second client device 208(2) are illustrated as being in communication with AR device 202. In this regard, the first client device 208(1) and the second client device 208(2) may be "clients" of the AR device 202 and are described herein as such. Nevertheless, it is to be known and understood that the first client device 208(1) and/or the second client device 208(2) need not necessarily be "clients" of the AR device 202, or any entity described in association therewith herein. Any additional or alternative relationship may exist between either or both of the first client device 208(1) and the second client device 208(2) and the AR device 202, or no relationship may exist.

Further, AR device 202 is illustrated as being able to access the one or more repositories 206(1) . . . 206(n). The AR module 302 may be configured to access these databases for implementing the method of generating the target pattern-based optimal scheduling policy for the set of jobs of an application.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AR device 202 via broadband or cellular communication. Of course, these embodiments are merely exemplary and are not limiting or exhaustive.

Figure 4:
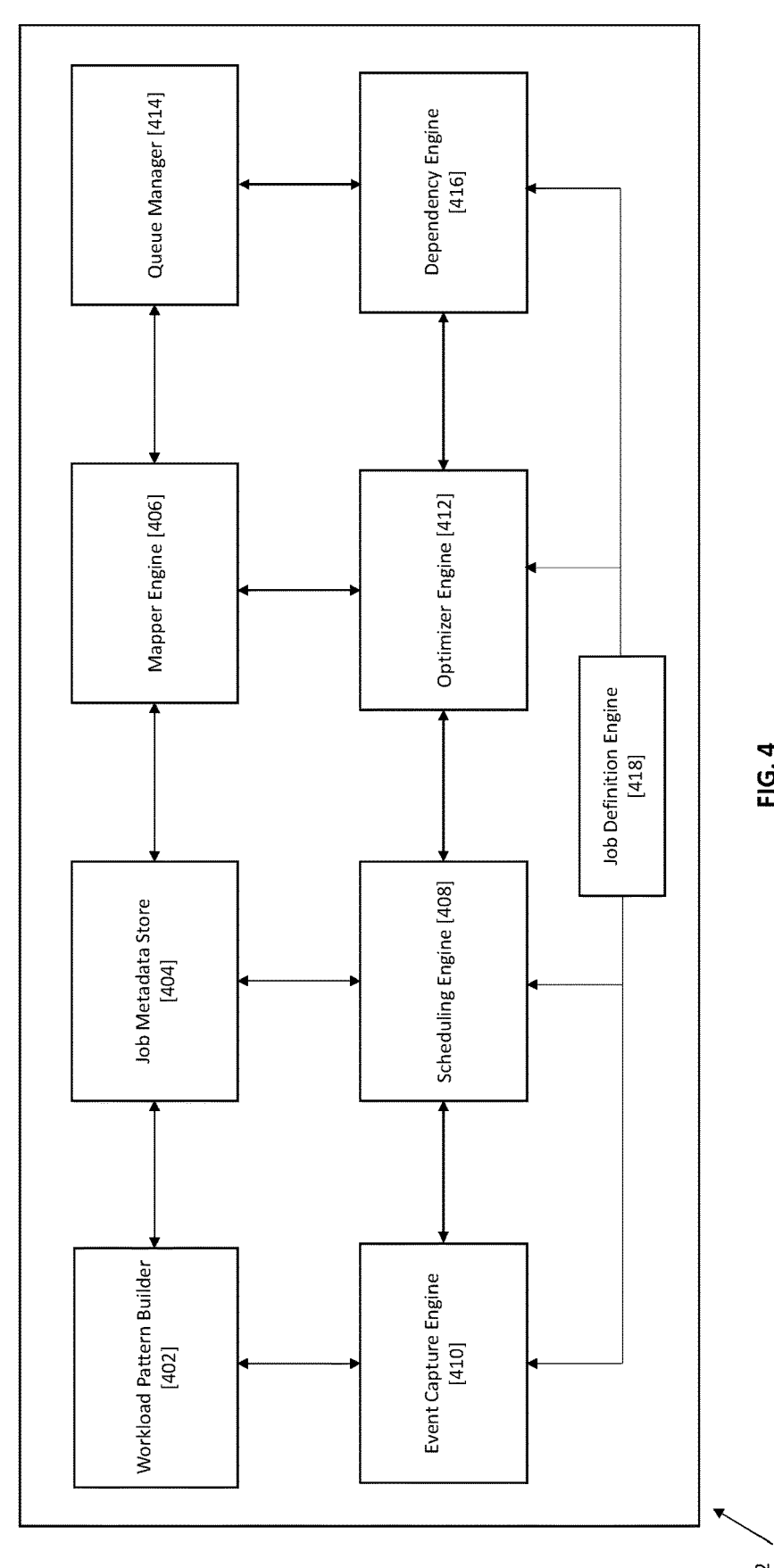
FIG. 4 illustrates an exemplary block diagram of an exemplary adaptive recommendation module for implementing a method for generating a target pattern-based optimal scheduling policy for a set of jobs of an application, in accordance with an exemplary embodiment.

An exemplary block diagram of an exemplary adaptive recommendation (AR) module 302 for implementing the method for generating the target pattern-based optimal scheduling policy for the set of jobs of the application is generally indicated in FIG. 4. As shown in FIG. 4, AR module 302 includes a workload pattern builder 402, a job metadata store 404, a mapper engine 406, a scheduling engine 408, an event capture engine 410, an optimizer engine 412, a queue manager 414, a dependency engine 416 and a job definition engine 418. Also, while only a few units are shown in FIG. 4, the AR module 302 may include multiple such units or any such number of units as is obvious to a person skilled in the art or as is required to implement the features of the present disclosure.

Upon being started, the AR module 302 executes the method for generating the target pattern-based optimal scheduling policy for the set of jobs of the application. An exemplary method for generating the target pattern-based optimal scheduling policy for the set of jobs of the application is generally indicated at flowchart 500 in FIG. 5.

In the method 500 of FIG. 5, at step S502 the method includes receiving, by a processor 104 via a communication interface, a historical telemetry data associated with the set of jobs, from a repository 206. Particularly, the historical telemetry data is associated with an execution of the set of jobs on at least one among a daily level, a monthly level, a quarterly level and a yearly level. Also, the historical telemetry data includes at least one among a storage consumption information, a CPU utilization information, a memory usage information, a buffer usage information, a disk activity information, and a network bandwidth usage information. For example, the storage consumption information may be a disk usage detail such as 1 terabyte (TB) disk usage, the CPU utilization information may be a core utilization detail, the memory usage information may be a random-access memory (RAM) usage detail, the buffer usage information may be a cache memory consumption detail, the disk activity information may be a detail of Input-Output (IO) operations such as read-write detail, and the network bandwidth usage information may be a detail of network bandwidth usage in bytes or packets etc. Moreover, in an exemplary implementation the historical telemetry data may include any information that relates to a historical execution of the set of jobs and is obvious to a person skilled in the art to implement the technical features of the present disclosure.

At step S504 the method includes generating, by the processor 104 via a workload pattern builder 402, a workload pattern of the set of jobs for each calendar day based on the historical telemetry data associated with the set of jobs. The workload pattern of the set of jobs is generated based on an implementation of a fuzzy logic technique on the historical telemetry data. The workload pattern of the set of jobs helps at least in 1) mapping each job from the set of jobs to a server or a run machine that is able to handle a workload as per a workload pattern of said each job, and 2) providing future recommendations related to an optimal schedule time, an optimal run machine and an optimal dependency job name etc.

Furthermore, the workload pattern of the set of jobs is categorized into at least one among a storage consumption category, a CPU utilization category, a memory usage category, a buffer usage category, a disk activity usage category, and a network bandwidth usage category based on the historical telemetry data that relates to the execution of the set of jobs on at least one among the daily level, the monthly level, the quarterly level and the yearly level. For example, as indicated in Table 1 below, the workload pattern of the set of jobs may be categorized into different sizing categories for different frequencies (such as for daily level or monthly level etc.) based on the implementation of the fuzzy logic technique on the historical telemetry data that relates to the execution of the set of jobs on at least one among the daily level, the monthly level, the quarterly level and the yearly level:

TABLE 1

| Category Name | Category Sizing detail |
| --- | --- |
| Storage consumption category | Very high Storage (Size XL), High Storage (Size L), Low Storage (Size S), Medium Storage (Size M) etc. |
| CPU utilization category | Very high CPU, High CPU, Low CPU, Medium CPU etc. |

TABLE 1-continued

| Category Name | Category Sizing detail |
| --- | --- |
| Memory usage category | Very high memory, High memory, Low memory, Medium memory etc. |
| Buffer usage category | Very high In-memory, High In-Memory, Low In-Memory, Medium In-memory etc. |
| Disk activity usage category | Very high reads-writes, High reads-writes, Low reads-writes, Medium reads-writes etc. |
| Network bandwidth usage category | Very high network packets, High network packets, low network packets, medium network packets etc. |

Further, the workload pattern of the set of jobs may be provided based on the sizing categories. For example, a workload pattern of a Job 1 may be as depicted in the below table (table 2):

TABLE 2

| Job Name | Calendar Day | Workload Pattern |
| --- | --- | --- |
| Job 1 | Day 1 | High network packets, Low CPU, Low memory, Low In-Memory, Medium Storage, Low reads, High Writes |
| Job 1 | Day 30 | High network packets, Low CPU, High memory, Low In-Memory, Medium Storage, Very High reads, Very High Writes |
| Job 1 | Day 15 | High network packets, Low CPU, High memory, Medium In-Memory, High Storage, Very High reads, High Writes |

At step S506 the method includes receiving, by the processor 104 at a job metadata store 404, a metadata store information of the set of jobs. The metadata store information of each job from the set of jobs includes but is not limited to at least one among a job name, a container image information, a command line, a cluster of run machines, a run machine category sizing data, a job schedule time slot configuration window, a dependency information, and a priority information. The job name indicates a name or identifier of said each job, purpose of the container image information is to package all necessary supporting artifacts (e.g., code, libraries, files, etc.) for the respective job, the command line indicates a command for execution of said each job, the cluster of run machines includes a set of run machines that is able to execute said each job, the run machine category sizing data indicates a sizing detail of corresponding run machine (e.g., "medium CPU, medium memory, low in-memory, medium storage, low reads, low writes", and "run machine up and running" etc.), the job schedule time slot configuration window includes a time window indicating a minimal time to start the execution of said each job and a maximum time to end the execution of said each job, the dependency information indicates a dependency of the execution of said each job on at least one other job in the set of jobs, and the priority information indicates a priority of the execution of said each job. In an exemplary implementation the metadata store information of the set of jobs is manually stored at the job metadata store 404.

After receiving the metadata store information, the method further includes creating by the processor 104 via a job definition engine 418, a job definition for each job from the set of jobs based on the metadata store information of said each job. The job definition of each job helps in execution of said each job on at least one run machine that is able to execute said each job. For example, an execution engine may execute an exemplary Job A based on a job definition of the Job A.

Next, at step S508 the method includes executing, by the processor 104 via a mapper engine 406 using a reinforcement learning technique, a set of actions based on the workload pattern of the set of jobs and the metadata store information of the set of jobs. For execution of the set of action the mapper engine 406 may map the different sizing categories associated with the workload pattern of the set of jobs with a run machine category sizing data available in the metadata store information of the set of jobs. Also, in an exemplary implementation of the present disclosure the step of executing, by the processor 104 via the mapper engine 406 using the reinforcement learning technique, the set of actions further comprises: 1) receiving in real time at the mapper engine 406 a heartbeat signal from at least one run machine of the cluster of run machines present in the metadata store information of said each job from the set of jobs, and 2) executing, by the processor 104 via the mapper engine 406 using the reinforcement learning technique, the set of actions based on the heartbeat signal from at least one run machine. The heartbeat signal from the at least one run machine indicates to the mapper engine 406 that said at least one run machine is up and is running fine. Therefore, in an event is no heartbeat signal is received at the mapper engine 406 from the at least one run machine, the mapper engine 406 automatically predicts that said at least one run machine is down and is not working fine. Accordingly, based on the implementation of the features of the present disclosure the mapper engine 406 executes the set of actions on the at least one run machine from which the heartbeat signal is received at the mapper engine 406 (e.g., the at least one run machine that is up and is running fine). Additionally, in an exemplary implementation of the present disclosure the heartbeat signal from the at least one run machine indicates to the mapper engine 406 a health score of the at least one run machine. The mapper engine 406 in said exemplary implementation executes the set of actions on run machine(s) from the at least one run machine that have a higher health score (e.g., run machine(s) that are comparatively better in run machine (s) that are up and working fine are considered by the mapper engine). Further, at step S510 the method includes generating, by the processor 104 via the mapper engine 406, an intermediate policy for the set of jobs based on the execution of the set of actions. The intermediate policy includes at least one among an intermediate schedule time, an intermediate run machine and an intermediate dependency job name.

Particularly, the step of the executing, by the processor 104 via the mapper engine 406 using the reinforcement learning technique, the set of actions includes at least one among: incrementally mapping the set of jobs to a set of respective run machines (for e.g., to run machine(s) that are up and working fine from a cluster of run machines that are able to execute the set of jobs), determining for the set of jobs at least one among a set of job schedule times, a set of type of executions, and a set of order of executions, and shuffling at least one among the set of job schedule times, the set of type of executions, and the set of order of executions. The reinforcement learning technique as disclosed in the present disclosure may be associated with a class of techniques for solving problems modelled as at least one among a Markov Decision Process (MDP) and a discrete time stochastic control process that provide a modelling decision making in situations where outcomes are partly random and partly under control of a decision maker. In this regard, the reinforcement learning technique may be composed of an agent (e.g., an autonomous entity which acts, directing its activity towards achieving goals), a set of states, and a set of actions per state (e.g., job slots), and an environment (e.g., run machine). Executing an action in a specific state provides the agent with a cost or a reward (e.g., in form of a numerical score). The goal of the agent is to maximize its total (e.g., future) reward. This is achieved by adding maximum reward attainable from future states to a reward for achieving its current state, effectively influencing a current action by a potential future reward. This potential future reward is a weighted sum of expected values of rewards of all future steps starting from the current state. Example of the reinforcement learning technique may include, but is not limited to, at least one among a Q-learning technique, a State-Action-Reward-State-Action (SARSA) technique, a Deep Q Network (DQN) technique, a Deep Deterministic Policy Gradient (DDPG) technique, an Actor-Critic (A2C) technique, and the like. More specifically, the mapper engine 406 executes the following actions using the reinforcement learning technique:

1) It incrementally maps the set of jobs to their corresponding servers (i.e., to run machines that are up and working fine and are indicated in the metadata store information of the set of jobs), where this mapping is based on the workload pattern of the jobs, 2) It shuffles job schedule times of the set of jobs that are falling between the job schedule time slot configuration window of the set of jobs (wherein a first job schedule time is a start point of the job schedule time slot configuration window), and 3) It also shuffles a type of execution of the set of jobs (e.g., a sequential execution or a parallel execution), and an order of execution of the set of jobs.

Particularly, the mapper engine 406 executes the above actions based on rewards defined for the set of jobs by the reinforcement learning technique. The reinforcement learning technique encompasses learning an optimal policy (e.g., the intermediate policy) for the set of jobs using the workload patterns of the set of jobs, and running the set of jobs on a simulation environment, against different configurations like schedule time, sequential execution, parallel execution, shuffle order of execution, and run machines, to derive best performance benchmark configuration (for e.g., best job execution time) as a reward for the set of jobs for different calendar days.

Further, considering an example where a list of run machines or servers that are up, working fine and are available in a metadata store information of a Job 2 is as below:

1) Server 1 supports High network packets, Low CPU, Low memory, Low In-Memory, Medium Storage, Low reads, and High Writes.

2) Server 2 supports High network packets, Low CPU, High memory, Low In-Memory, Medium Storage, Very High reads, Very High Writes.

3) Server 3 supports Low network packets, Low CPU, High memory, Low In-Memory, Medium Storage, Medium reads, Very High Writes.

Also, in the given example a workload pattern of the Job 2 may be as below:

1) Job 2 on calendar day 1 requires High network packets, Low CPU, High memory, Low In-Memory, Medium Storage, Very High reads, Very High Writes.

2) Job 2 on calendar day 9 requires Low network packets, Low CPU, High memory, Low In-Memory, Medium Storage, Medium reads, Very High Writes.

3) Job 2 on calendar day 5 requires High network packets, Low CPU, Low memory, Low In-Memory, Medium Storage, Low reads, and High Writes In such example an exemplary mapping of the Job 2 to the servers available in the metadata store information of the Job 2 is as below:

1) Job 2 on calendar day 1 to be executed on server 2.

2) Job 2 on calendar day 5 to be executed on server 1.

3) Job 2 on calendar day 9 to be executed on server 3.

Next, at step S512 the method includes executing, by the processor 104 via a scheduling engine 408, the set of jobs on a set of respective run machines based on the workload pattern of the set of jobs and the intermediate policy. In an exemplary implementation of the present disclosure, the scheduling engine 408 prior to the execution of the set of jobs ensures that the container image information that is available in the metadata store information of each job from the set of jobs is present in the set of respective run machines of the set of jobs, else the scheduling engine 408 places and executes a container image information that has code infrastructure for respective job(s) from the set of jobs. Thereafter, at step S514 the method includes determining, by the processor 104 via an event capture engine 410, a feedback data based on the execution of the set of jobs on the set of respective run machines. The feedback data includes at least one among an application log data and a performance metric. In an example the application log data may include but is not limited to at least one syslog, at least one sys event, at least one database trace, etc. Also, in an example the performance metric may include but is not limited to a memory related detail, a disk IO related detail, a network related detail, a storage related detail, a CPU related detail, a job completion time, and the like.

Next, at step S516 the method includes generating, by the processor 104 via an optimizer engine 412 using the reinforcement learning technique, the target pattern-based optimal scheduling policy for the set of jobs based on at least one among the feedback data, and the set of actions. The target pattern-based optimal scheduling policy includes at least one among a target optimal schedule time, a target optimal run machine and a target optimal dependency job name.

The method further includes generating by the processor 104 via a queue manager 414 a sequence of execution for each job based on the dependency information, the priority information, and an availability of a set of run machines to execute said job. The queue manager 414 manages a request to execute the set of job received from the execution engine, in queue (e.g., in sequence of execution), based on an availability of a set of run machines to execute the set of job and the dependency of the execution of each job on at least one other job in the set of jobs.

Also, the method further includes determining, by the processor 104 via a dependency engine 416, a directed acyclic graph of at least one dependent job from the set of jobs based on the feedback data and the metadata store information. More specifically, the dependency engine 416 uses the metadata store information and the application log data to identify common dependent objects as the directed acyclic graph (DAG) to derive a hierarchy of job execution or an order of job execution. The DAG may be passed as node embeddings or vector space to the optimizer engine 412, wherein the optimizer engine 412 may use the DAG to generate the target pattern-based optimal scheduling policy.

Furthermore, the step of the generating, by the processor 104 via the optimizer engine 412 using the reinforcement learning technique, the target pattern-based optimal scheduling policy for the set of jobs is further based on at least one among the sequence of execution for each job and the directed acyclic graph. Therefore, in an implementation of the present disclosure the optimizer engine 412 may receive the historical telemetry data associated with the set of jobs, the intermediate policy from the mapper engine 406, the sequence of execution of the set of jobs from the queue manager 414, the hierarchy of job execution or the DAG from the dependency engine 416, and the application log data and the performance metric from the event capture engine 410. The optimizer engine 412 then implements the reinforcement learning technique which uses the data received on the optimizer engine 412 to derive incrementally best schedule(s) or time slot(s) for the set of jobs on given run machines, to further generate the target pattern-based optimal scheduling policy for the set of jobs, wherein an example of the reinforcement learning technique may include, but is not limited to, at least one among the Q-learning technique, the State-Action-Reward-State-Action (SARSA) technique, the Deep Q Network (DQN) technique, the Deep Deterministic Policy Gradient (DDPG) technique, the Actor-Critic (A2C) technique, and the like. The target pattern-based optimal scheduling policy includes at least one among best optimal schedule time, best optimal run machine and best optimal dependency job name. Moreover, in an exemplary implementation the optimizer engine 412 may use weighted sum of rewards generated using the reinforcement learning technique to incorporate multiple parameters like an execution time and a job schedule time slot configuration window etc.

Therefore, the present disclosure provides a technical solution that identifies optimized job schedules for various batch workloads of an application, which defines an order of job execution (sequence execution or parallel execution) to execute the batch workloads on optimized machines (cost-effective) based on workload pattern(s) of the batch workloads after incremental analysis. The present disclosure also provides a technical solution that is able to capture job dependencies as Directed Acyclic Graph (DAG) by looking for concurrency among jobs of the application, where the DAG may be used as a feature through node embedding to derive an optimized job. Additionally, the technical solution as disclosed in the present disclosure is technically advanced over the existing solutions as it uses fuzzy logic techniques to classify a historical workload of the jobs for every calendar day and uses the same to derive an optimized server from a cluster of servers available for execution of the jobs. Also, the technical solution as disclosed in the present disclosure uses the reinforcement learning technique such as the Q-learning technique, the State-Action-Reward-State-Action (SARSA) technique, the Deep Q Network (DQN) technique, the Deep Deterministic Policy Gradient (DDPG) technique, the Actor-Critic (A2C) technique or the like to dynamically identify an optimized batch job schedule for a batch job by deriving an optimized policy based on rewards, which is an overall execution time of the batch job, therefore provides a technical advancement over the existing solutions. Moreover, the present technical solution provides a two-dimensional output—1) A job schedule that yields fastest execution time for every workload pattern frequency by accommodating dependencies and job configuration window, and 2) cost-effective servers for execution of every workload pattern frequency.

Figure 6:
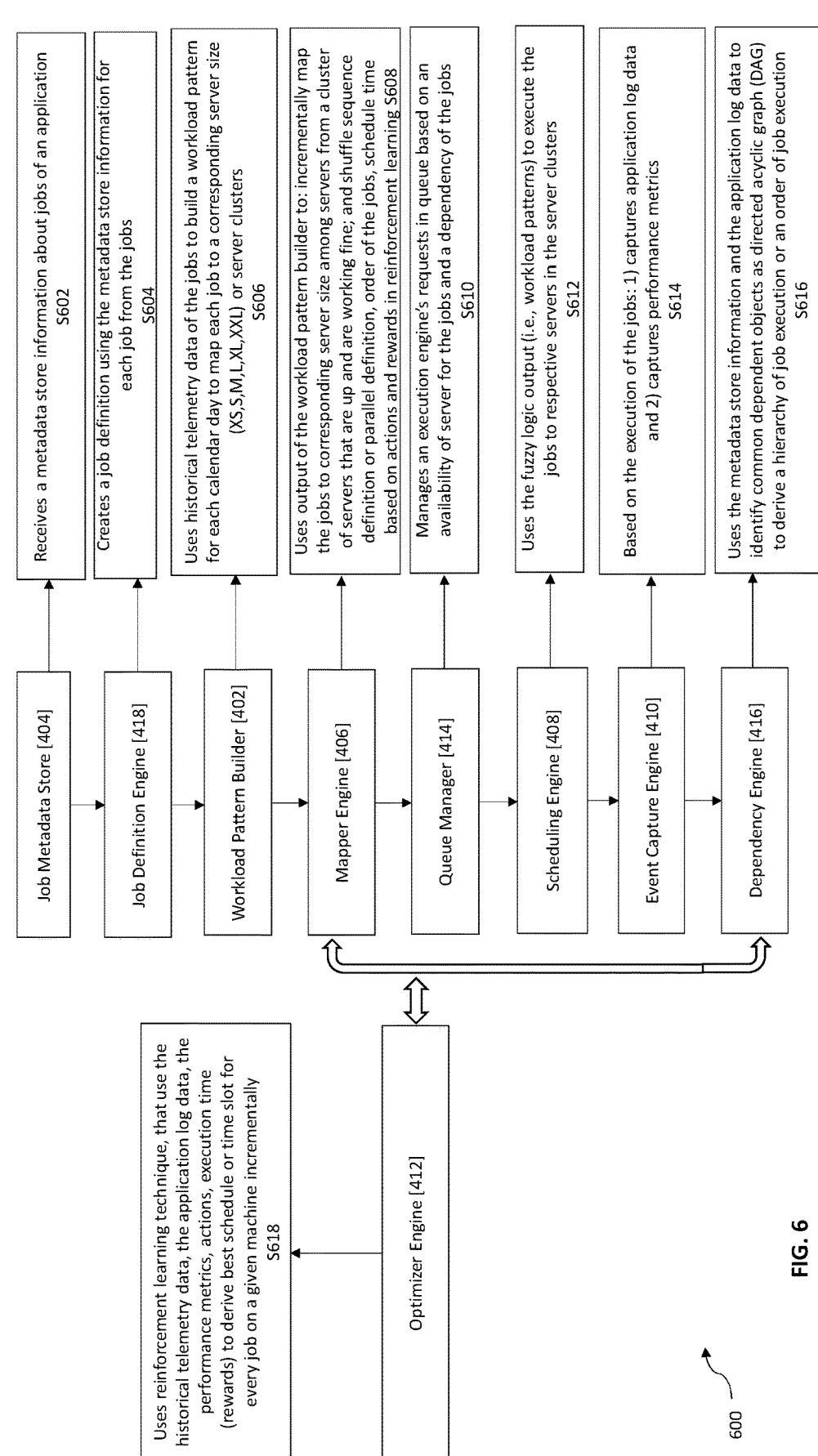
FIG. 6 illustrates an exemplary process flow diagram for implementing a method for generating a target pattern-based optimal scheduling policy for a set of jobs of an application, in accordance with an exemplary embodiment.

Referring to FIG. 6 that illustrates an exemplary process flow diagram for implementing a method for generating a target pattern-based optimal scheduling policy for a set of jobs of an application, in accordance with an exemplary embodiment.

In the process 600 of FIG. 6, at step S602 the process depicts that a Job Metadata Store 404 receives a metadata store information about jobs of the application, wherein the metadata store information of each job from the jobs of the application includes but is not limited to at least one among a job name, a container image information (say a workload container image name), a command line, a cluster of run machines, a run machine category sizing data (say run machine server sizing category), a job schedule time slot configuration window, a dependency information, and a priority information etc.

Further, at step S604 the process depicts that a job definition engine 418 creates a job definition using the metadata store information for each job from the jobs.

Next, at step S606 the process depicts that a workload pattern builder 402 uses a historical telemetry data of the jobs to build a workload pattern for each calendar day to map each job to a corresponding server size (e.g., XS, S, M, L, XL, XXL etc.) or server clusters for future recommendations (such as for recommending an optimal schedule time, an optimal run machine, an optimal dependency job name etc.), so that cost-effective servers are utilized.

Next, at step S608 the process depicts that a mapper engine 406 uses an output of the workload pattern builder 402 to: incrementally map the jobs to corresponding server size among servers from a cluster of servers that are up and are working fine; and shuffle sequence definition or parallel definition, order of the jobs, schedule time based on actions and rewards in reinforcement learning.

Thereafter, at step S610 the process depicts that a queue manager 414 manages an execution engine's requests in queue based on an availability of server for the jobs and a dependency of the jobs.

Next, at step S612 the process depicts that a scheduling engine 408 uses the fuzzy logic output (i.e., workload patterns) to execute the jobs to respective servers in the server clusters.

Further, at step S614 the process depicts that an event capture engine 410 based on the execution of the jobs: 1) captures application log data-syslogs, sys events, database traces, etc., and 2) captures performance metrics-memory, disk IO, network, storage, CPU, job completion time etc.

Next, at step S616 the process depicts that a dependency engine 416 uses the metadata store information and the application log data to identify common dependent objects as directed acyclic graph (DAG) to derive a hierarchy of job execution or an order of job execution. DAG are passed as node embeddings or vector space to an optimizer engine 412.

Thereafter, at step S618 the process depicts that the optimizer engine 412 receives an output from at least one among the mapper engine 406, the scheduling engine 408, the event capture engine 410, the queue manager 414, and the dependency engine 416. The optimizer engine 412 then uses the reinforcement learning technique, that use the historical telemetry data, the application log data, the performance metrics, actions, and execution time (rewards) etc. to derive best schedule or time slot for every job on a given machine incrementally. In an exemplary implementation of the present disclosure a weighted sum of the rewards may be used to incorporate multiple parameters like the execution time and a job schedule time slot configuration window.

Furthermore, an aspect of the present disclosure relates to a non-transitory computer readable storage medium storing instructions for generating a target pattern-based optimal scheduling policy for a set of jobs of an application. The instructions include executable code which, when executed by a processor 104, may cause the processor 104 to: receive, via a communication interface from a repository, a historical telemetry data associated with the set of jobs; generate, via a workload pattern builder 402, a workload pattern of the set of jobs for each calendar day based on the historical telemetry data associated with the set of jobs; receive, at a job metadata store 404, a metadata store information of the set of jobs; execute, via a mapper engine 406 using a reinforcement learning technique, a set of actions based on the workload pattern of the set of jobs and the metadata store information of the set of jobs; generate, via the mapper engine 406, an intermediate policy for the set of jobs based on the execution of the set of actions; execute, via a scheduling engine 408, the set of jobs on a set of respective run machines based on the workload pattern of the set of jobs and the intermediate policy; determine, via an event capture engine 410, a feedback data based on the execution of the set of jobs on the set of respective run machines; and generate, via an optimizer engine 412 using the reinforcement learning technique, the target pattern-based optimal scheduling policy for the set of jobs based on at least one among the feedback data, and the set of actions.

In accordance with an exemplary embodiment, the historical telemetry data is further associated with an execution of the set of jobs on at least one among a daily level, a monthly level, a quarterly level and a yearly level, and the historical telemetry data may include at least one among a storage consumption information, a CPU utilization information, a memory usage information, a buffer usage information, a disk activity information, and a network bandwidth usage information. Also, the workload pattern of the set of jobs is generated based on an implementation of a fuzzy logic technique on the historical telemetry data, and the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level. Moreover, the metadata store information of each job from the set of jobs may include at least one among a job name, a container image information, a command line, a cluster of run machines, a run machine category sizing data, a job schedule time slot configuration window, a dependency information, and a priority information.

Further, in accordance with an exemplary embodiment, when executed by the processor 104, the executable code may further cause the processor 104 to: 1) generate, via a queue manager 414, a sequence of execution for each job based on the dependency information, the priority information, and an availability of a set of run machines to execute said job; and 2) determine, via a dependency engine 416, a directed acyclic graph of at least one dependent job from the set of jobs based on the feedback data and the metadata store information. Further, when executed by the processor 104, the executable code may further cause the processor 104 to generate, via the optimizer engine 412 using the reinforcement learning technique, the target pattern-based optimal scheduling policy for the set of jobs based on at least one among the sequence of execution for each job and the directed acyclic graph.

Also, in accordance with an exemplary embodiment, when executed by the processor 104, the executable code may further cause the processor 104 to create via a job definition engine 418, a job definition for each job from the set of jobs based on the metadata store information of said each job.

In accordance with an exemplary embodiment, when executed by the processor 104, the executable code to execute the set of actions may further cause the processor 104 to: incrementally map the set of jobs to the set of respective run machines; determine for the set of jobs at least one among a set of job schedule times, a set of type of executions, and a set of order of executions; and shuffle at least one among the set of job schedule times, the set of type of executions, and the set of order of executions.

In accordance with an exemplary embodiment, the intermediate policy may include at least one among an intermediate schedule time, an intermediate run machine and an intermediate dependency job name; and the target pattern-based optimal scheduling policy may include at least one among a target optimal schedule time, a target optimal run machine and a target optimal dependency job name.

In accordance with an exemplary embodiment, the feedback data may include at least one among an application log data and a performance metric.

Therefore, the present disclosure provides a technical solution for generating and providing the target pattern-based optimal scheduling policy for the set of jobs of the application, which overcomes limitations of the existing solutions such as including but is not limited to the limitations of the known arts as described in the present disclosure.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/or "computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the present disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a target pattern-based optimal scheduling policy for a set of jobs of an application, the method being implemented by at least one processor, the method comprising:

receiving, by the at least one processor via a communication interface, a historical telemetry data associated with the set of jobs, from a repository;

generating, by the at least one processor via a workload pattern builder, a workload pattern of the set of jobs for each calendar day based on the historical telemetry data associated with the set of jobs;

receiving, by the at least one processor at a job metadata store, a metadata store information of the set of jobs;

executing, by the at least one processor via a mapper engine using a reinforcement learning technique, a set of actions based on the workload pattern of the set of jobs and the metadata store information of the set of jobs;

generating, by the at least one processor via the mapper engine, an intermediate policy for the set of jobs based on the execution of the set of actions;

executing, by the at least one processor via a scheduling engine, the set of jobs on a set of respective run machines based on the workload pattern of the set of jobs and the intermediate policy;

determining, by the at least one processor via an event capture engine, a feedback data based on the execution of the set of jobs on the set of respective run machines; and generating, by the at least one processor via an optimizer engine using the reinforcement learning technique, the target pattern-based optimal scheduling policy for the set of jobs based on at least one among the feedback data, and the set of actions.

2. The method as claimed in claim 1, wherein the historical telemetry data is further associated with an execution of the set of jobs on at least one among a daily level, a monthly level, a quarterly level and a yearly level, and wherein the historical telemetry data comprises at least one among a storage consumption information, a CPU utilization information, a memory usage information, a buffer usage information, a disk activity information, and a network bandwidth usage information.

3. The method as claimed in claim 2, wherein the workload pattern of the set of jobs is generated based on an implementation of a fuzzy logic technique on the historical telemetry data, and wherein the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level.

4. The method as claimed in claim 1, wherein the metadata store information of each job from the set of jobs comprises at least one among a job name, a container image information, a command line, a cluster of run machines, a run machine category sizing data, a job schedule time slot configuration window, a dependency information, and a priority information.

5. The method as claimed in claim 4, the method further comprising:

generating, by the at least one processor via a queue manager, a sequence of execution for each job based on the dependency information, the priority information, and an availability of a set of run machines to execute said job, determining, by the at least one processor via a dependency engine, a directed acyclic graph of at least one dependent job from the set of jobs based on the feedback data and the metadata store information, and generating, by the at least one processor via the optimizer engine using the reinforcement learning technique, the target pattern-based optimal scheduling policy for the set of jobs based on at least one among the sequence of execution for each job and the directed acyclic graph.

6. The method as claimed in claim 1, the method further comprising: creating, by the at least one processor via a job definition engine, a job definition for each job from the set of jobs based on the metadata store information of said each job.

7. The method as claimed in claim 1, wherein the executing, by the at least one processor via the mapper engine using the reinforcement learning technique, the set of actions comprises at least one among:

incrementally mapping the set of jobs to the set of respective run machines, determining for the set of jobs at least one among a set of job schedule times, a set of type of executions, and a set of order of executions, and shuffling at least one among the set of job schedule times, the set of type of executions, and the set of order of executions.

8. The method as claimed in claim 1, wherein the intermediate policy comprises at least one among an intermediate schedule time, an intermediate run machine and an intermediate dependency job name, and the target pattern-based optimal scheduling policy comprises at least one among a target optimal schedule time, a target optimal run machine and a target optimal dependency job name.

9. The method as claimed in claim 1, wherein the feedback data comprises at least one among an application log data and a performance metric.

10. A computing device for generating a target pattern-based optimal scheduling policy for a set of jobs of an application, the computing device comprising:

a processor;

a memory; and a communication interface coupled to each of the processor and the memory, wherein the processor is configured to:

receive, via the communication interface from a repository, a historical telemetry data associated with the set of jobs, generate, via a workload pattern builder, a workload pattern of the set of jobs for each calendar day based on the historical telemetry data associated with the set of jobs, receive, at a job metadata store, a metadata store information of the set of jobs, execute, via a mapper engine using a reinforcement learning technique, a set of actions based on the workload pattern of the set of jobs and the metadata store information of the set of jobs, generate, via the mapper engine, an intermediate policy for the set of jobs based on the execution of the set of actions, execute, via a scheduling engine, the set of jobs on a set of respective run machines based on the workload pattern of the set of jobs and the intermediate policy, determine, via an event capture engine, a feedback data based on the execution of the set of jobs on the set of respective run machines, and generate, via an optimizer engine using the reinforcement learning technique, the target pattern-based optimal scheduling policy for the set of jobs based on at least one among the feedback data, and the set of actions.

11. The computing device as claimed in claim 10, wherein the historical telemetry data is further associated with an execution of the set of jobs on at least one among a daily level, a monthly level, a quarterly level and a yearly level, and wherein the historical telemetry data comprises at least one among a storage consumption information, a CPU utilization information, a memory usage information, a buffer usage information, a disk activity information, and a network bandwidth usage information.

12. The computing device as claimed in claim 11 wherein the workload pattern of the set of jobs is generated based on an implementation of a fuzzy logic technique on the historical telemetry data, and wherein the workload pattern of the set of jobs is categorized into at least one among a storage consumption category, a CPU utilization category, a memory usage category, a buffer usage category, a disk activity usage category, and a network bandwidth usage category based on the execution of the set of jobs on at least one among the daily level, the monthly level, the quarterly level and the yearly level.

13. The computing device as claimed in claim 10, wherein the metadata store information of each job from the set of jobs comprises at least one among a job name, a container image information, a command line, a cluster of run machines, a run machine category sizing data, a job schedule time slot configuration window, a dependency information, and a priority information.

14. The computing device as claimed in claim 13, wherein the processor is further configured to:

generate, via a queue manager, a sequence of execution for each job based on the dependency information, the priority information, and an availability of a set of run machines to execute said job, determine, via a dependency engine, a directed acyclic graph of at least one dependent job from the set of jobs based on the feedback data and the metadata store information, and generate, via the optimizer engine using the reinforcement learning technique, the target pattern-based optimal scheduling policy for the set of jobs based on at least one among the sequence of execution for each job and the directed acyclic graph.

15. The computing device as claimed in claim 10, wherein the processor is further configured to create via a job definition engine, a job definition for each job from the set of jobs based on the metadata store information of said each job.

16. The computing device as claimed in claim 10, wherein to execute the set of actions the processor is further configured to:

incrementally map the set of jobs to the set of respective run machines, determine for the set of jobs at least one among a set of job schedule times, a set of type of executions, and a set of order of executions, and shuffle at least one among the set of job schedule times, the set of type of executions, and the set of order of executions.

17. The computing device as claimed in claim 10, wherein the intermediate policy comprises at least one among an intermediate schedule time, an intermediate run machine and an intermediate dependency job name, and the target pattern-based optimal scheduling policy comprises at least one among a target optimal schedule time, a target optimal run machine and a target optimal dependency job name.

18. The computing device as claimed in claim 10, wherein the feedback data comprises at least one among an application log data and a performance metric.

19. A non-transitory computer readable storage medium storing instructions for generating a target pattern-based optimal scheduling policy for a set of jobs of an application, the storage medium comprising executable code which, when executed by a processor, causes the processor to:

receive, via a communication interface from a repository, a historical telemetry data associated with the set of jobs;

generate, via a workload pattern builder, a workload pattern of the set of jobs for each calendar day based on the historical telemetry data associated with the set of jobs;

receive, at a job metadata store, a metadata store information of the set of jobs;

execute, via a mapper engine using a reinforcement learning technique, a set of actions based on the workload pattern of the set of jobs and the metadata store information of the set of jobs;

generate, via the mapper engine, an intermediate policy for the set of jobs based on the execution of the set of actions;

execute, via a scheduling engine, the set of jobs on a set of respective run machines based on the workload pattern of the set of jobs and the intermediate policy;

determine, via an event capture engine, a feedback data based on the execution of the set of jobs on the set of respective run machines; and generate, via an optimizer engine using the reinforcement learning technique, the target pattern-based optimal scheduling policy for the set of jobs based on at least one among the feedback data, and the set of actions.

20. The storage medium as claimed in claim 19, wherein when executed by the processor, the executable code further causes the processor to:

generate, via a queue manager, a sequence of execution for each job based on a dependency information, a priority information, and an availability of a set of run machines to execute said job, determine, via a dependency engine, a directed acyclic graph of at least one dependent job from the set of jobs based on the feedback data and the metadata store information, and generate, via the optimizer engine using the reinforcement learning technique, the target pattern-based optimal scheduling policy for the set of jobs based on at least one among the sequence of execution for each job and the directed acyclic graph.

* * * * *